United States Patent
Leach et al.

(10) Patent No.: US 9,208,332 B2
(45) Date of Patent: Dec. 8, 2015

(54) SCOPED RESOURCE AUTHORIZATION POLICIES

(75) Inventors: Paul Leach, Seattle, WA (US); David McPherson, Bothell, WA (US); Vishal Agarwal, Bothell, WA (US); Mark Fishel Novak, Newcastle, WA (US); Ming Tang, Redmond, WA (US); Ramaswamy Ranganathan, Bellevue, WA (US); Pranav Kukreja, Bellevue, WA (US); Andrey Popov, Renton, WA (US); Nir Ben Zvi, Redmond, WA (US); Arun K. Nanda, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 442 days.

(21) Appl. No.: 12/978,451

(22) Filed: Dec. 24, 2010

(65) Prior Publication Data

US 2012/0167158 A1  Jun. 28, 2012

(51) Int. Cl.
*G06F 21/60* (2013.01)
*G06Q 10/06* (2012.01)

(52) U.S. Cl.
CPC .............. *G06F 21/604* (2013.01); *G06Q 10/06* (2013.01)

(58) Field of Classification Search
None
See application file for complete search history.

(56) References Cited

U.S. PATENT DOCUMENTS

| | | | |
|---|---|---|---|
| 7,185,192 B1 | 2/2007 | Kahn | |
| 7,216,125 B2 * | 5/2007 | Goodwin | 1/1 |
| 7,249,179 B1 | 7/2007 | Romero et al. | |
| 7,398,308 B2 | 7/2008 | Friedel et al. | |
| 7,640,574 B1 | 12/2009 | Kim et al. | |
| 7,685,206 B1 | 3/2010 | Mathew et al. | |
| 8,315,993 B2 * | 11/2012 | Kaplan | 707/694 |
| 8,464,317 B2 * | 6/2013 | Hinton et al. | 726/4 |
| 8,893,215 B2 * | 11/2014 | Burghart | 726/1 |
| 2005/0132220 A1 | 6/2005 | Chang et al. | |
| 2007/0056018 A1 | 3/2007 | Ridlon et al. | |

(Continued)

FOREIGN PATENT DOCUMENTS

| | | |
|---|---|---|
| CN | 1956479 A | 5/2007 |
| CN | 101297282 A | 10/2008 |

OTHER PUBLICATIONS

"International Search Report and the Written Opinion of the International Searching Authority", Mailed Date—Jul. 30, 2012, Application No. PCT/US2011/067296, Filed Date—Dec. 24, 2011, 9 pages.

(Continued)

*Primary Examiner* — Minh Dinh
(74) *Attorney, Agent, or Firm* — Timothy Churna; Judy Yee; Micky Minhas

(57) ABSTRACT

Resource authorization policies and resource scopes may be defined separately, thereby decoupling a set of authorization rules from the scope of resources to which those rules apply. In one example, a resource includes anything that can be used in a computing environment (e.g., a file, a device, etc.). A scope describes a set of resources (e.g., all files in folder X, all files labeled "Y", etc.). Policies describe what can be done with a resource (e.g., "read-only," "read/write," "delete, if requestor is a member of the admin group," etc.). When scopes and policies have been defined, they may be linked, thereby indicating that the policy applies to any resource within the scope. When a request for the resource is made, the request is evaluated against all policies associated with scopes that contain the resource. If the conditions specified in the policies apply, then the request may be granted.

20 Claims, 6 Drawing Sheets

(56) References Cited

U.S. PATENT DOCUMENTS

| | | | |
|---|---|---|---|
| 2007/0056019 A1 | 3/2007 | Allen et al. | |
| 2007/0157287 A1* | 7/2007 | Lim | 726/1 |
| 2007/0261124 A1 | 11/2007 | Centonze et al. | |
| 2008/0028436 A1* | 1/2008 | Hannel et al. | 726/1 |
| 2008/0320299 A1 | 12/2008 | Wobber et al. | |
| 2009/0249431 A1* | 10/2009 | McCollum et al. | 726/1 |
| 2009/0300706 A1* | 12/2009 | Ray et al. | 726/1 |
| 2011/0126281 A1 | 5/2011 | Ben-Zvi et al. | |

OTHER PUBLICATIONS

Moffett, et al., "Specifying Discretionary Access Control Policy for Distributed Systems", Retrieved at << http://citeseerx.ist.psu.edu/viewdoc/download?doi=10.1.1.41.6306&rep=rep1&type=pdf >>, Computer Communications, vol. 13, No. 9, Sep. 18, 1990, p. 1-17.

Osborn, et al., "Configuring Role-Based Access Control to Enforce Mandatory and Discretionary Access Control Policies", Retrieved at << http://citeseerx.ist.psu.edu/viewdoc/download?doi=10.1.1.86.6336&rep=rep1&type=pdf >>, ACM Transactions on Information and System Security, vol. 3, No. 2, May 2000, p. 85-106.

Brindle, et al., "Enforcing Flexible Access Control in a Networked Policy Domain", Retrieved at << http://www.tresys.com/pdf/Enforcing-Flexible-Access-Control.pdf >>, Mar. 12, 2007, p. 1-11.

Search Report in Chinese Patent Application No. 201110441017.7, dated Apr. 11, 2014, 2 pages.

"Supplementary Search Report Issued in European Patent Application No. 11851750.7", Mailed Date: Jul. 2, 2014, 5 Pages.

"Second Office Action Issued in Chinese Patent Application No. 201110441017.7", Mailed Date: Dec. 25, 2014, 11 Pages.

"Third Office Action Issued in Chinese Patent Application No. 201110441017.7", Mailed Date: Jun. 24, 2015, 10 Pages.

* cited by examiner

SCOPED RESOURCE AUTHORIZATION POLICIES

BACKGROUND

In large-scale computing environments, particularly those that are distributed across many machines, defining and enforcing authorization policies may be difficult.

A resource is anything that can be subject to a policy that governs what can be done with the resource. Examples of resources include files, devices, etc. Examples of things that can be done with a resource pursuant to a policy include reading, writing, executing, deleting, etc. One type of authorization system attaches a set of permissions to each resource, where the permissions define what actions can be done with a resource, and who or what has permission to perform the action. For example, a file might have a set of permissions that grant read/write/execute/delete access to the owner of the file, read-only access to a particular group, and no authorization to all other entities. In one example, this permission is attached to the resource, and is set individually for each resource.

Some systems attempt to assign permissions collectively for broad classes of resources. However, in practice, some of these systems prove unworkable, because control over classes of resource is not sufficiently fine-grained, and these systems lack the flexibility to define accurately the policies that apply to particular resources or classes of resources.

SUMMARY

Resource authorization policies may be defined in a way that decouples the notion of policy scope from the policy itself. An interface may be provided that allows an administrator, or other party, to define authorization policies and resource scopes. The scopes and the policies may be defined separately. When an entity seeks to perform an action with respect to the resource, the policies and scopes are accessed. It can then be determined which scopes the resource falls into, and which policies apply to those scopes. A resource guard can then determine whether the policy's specified conditions for the requested use of the resource are satisfied. The policies may include global policies defined at a central level, as well as local policies that are specific to the machine (or group of machines, or environment) in which access is sought. If the conditions for the requested action are met, then the entity is allowed to proceed with the requested action. Otherwise, the requested action is denied.

A resource scope describes the resources to which a policy can apply (even if the applicable policy, itself, has not been identified or defined yet). Examples of scopes could include "all files that are in a particular folder," "all files in some sub-tree of an overall directory tree" (e.g., all files in a particular folder, or in any sub-folder), "all resources that have a particular label," "all files, if the current time is after 5 pm on a Friday," "all files located on servers in Germany," or any other appropriate definition of a set of resources. An authorization policy describes what can be done with a resource, and under what circumstances. Examples of authorization policies include "read-only authorization for all users," "read/write authorization for all members of the 'finance' group," "delete authorization for members of the 'admin' group," "retain until Jan. 1, 2011, " or any other description of something that can (or cannot) be done with a resource. Each scope and each policy may be assigned a name or identifier. An administrator can cause a policy to apply to resources within a particular scope by using the names or identifiers to link the policy with a scope. A policy can be linked to more than one scope, and a scope can be linked to more than one policy.

Policies and scopes may be defined centrally, and may be propagated to machines in a distributed computing environment. A request to use a resource may be evaluated on the machine at which the request is made (or on another machine that hosts the resource that is being requested), using the policies and scopes that have been defined centrally.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
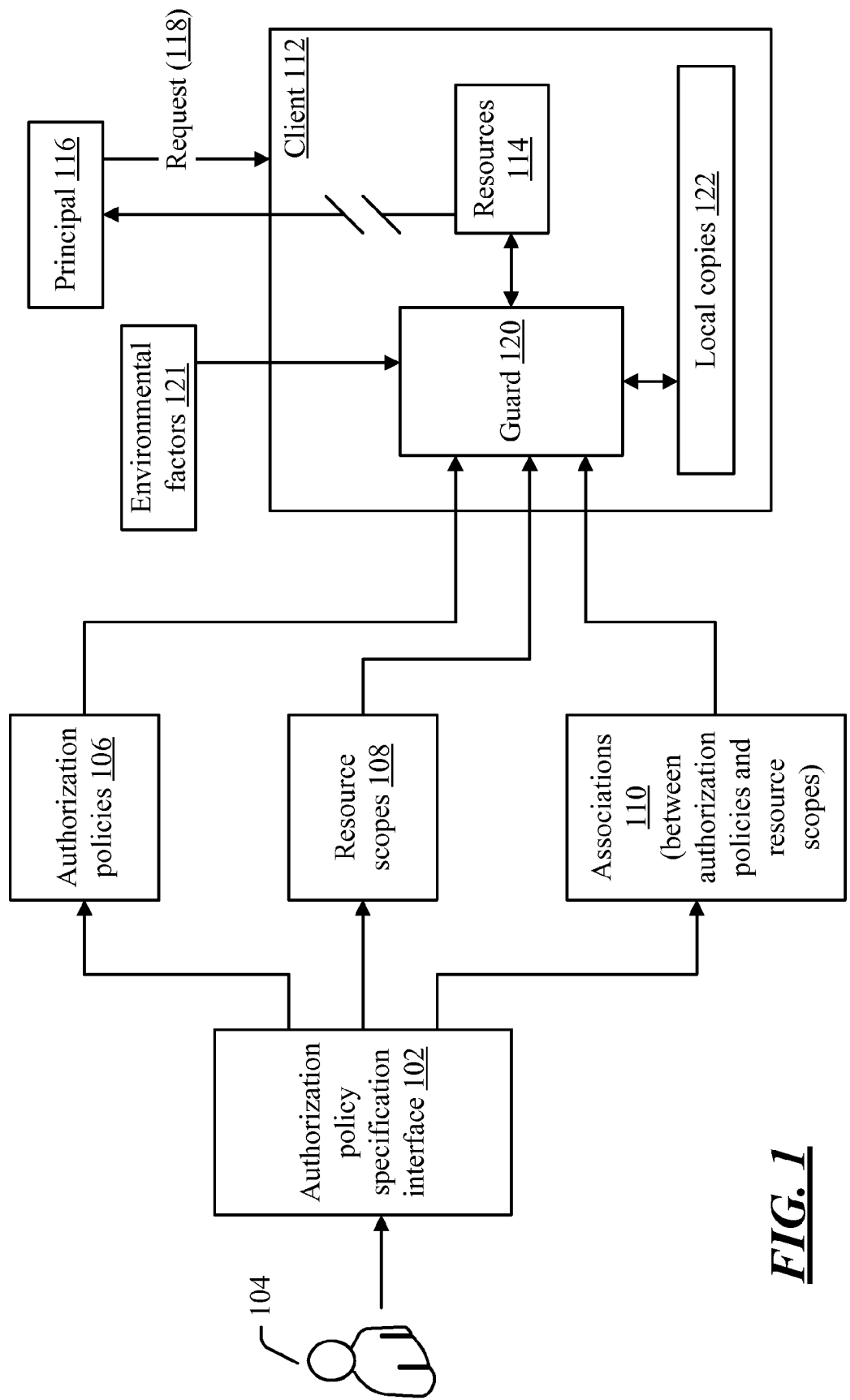
FIG. 1 is a block diagram of an example scenario in which policies and scopes may be created and applied.

In computing environments, resources are generally subject to authorization policies that govern how the resources can be used, and under what circumstances. Resources may include files, devices, or any other component that can be used in some way. The policies specify what can be done with these resources. For example, some resources can be read but not written (a "read-only" policy). Some resources can be read and written (a "read/write" policy). Some resources have to be retained; others may be deleted. Some types of resources (e.g., executable files) can be executed, while others cannot. In some cases, whether a given permission can be exercised depends on the circumstances. For example, a policy might say that a file is read/write for administrators, but read-only for other users (in which case the "circumstances" under which use of a resource is being requested include the identity of the principal who is making the request). The policy might also be defined in terms of environmental factors, such as the health of the device from which the request is made, the physical location of the server and/or requestor, etc.

In some example systems, a resource has a set of permissions that attaches to the resource, and that is defined individually for the resource. For example, it might be possible to allow a file to be read, written, and/or executed. These three types of actions might be authorized for three separate classes of entities—e.g., the user who owns the file, the user's group, and the public at large. Each file, therefore, might have a label attached saying whether there is read permission for the file owner, write permission for the owner, execute permission for the owner, read permission for the group, and so on. This level of control is generally too coarse for modern distributed computing environments, where the rules about who can do what with a resource may be more complicated. However, modern systems that provide control over resources in large-scale distributed environments generally have not provided sufficiently fine-grained control, and therefore have been unworkable.

The subject matter described herein provides for flexible control over resources by decoupling the notion of an authorization policy from the notion of a policy scope. A policy describes what can be done with a set of resources, and under what conditions. A resource scope describes a set of resources to which a policy may apply. The policy and the scope may be defined separately. A policy may be defined even if it is unknown what resources the policy will apply to. Similarly, a scope may be defined, even if it is unknown what policies will be assigned to the scope. Once policies and scopes have been defined, a given policy may be linked with a given scope, thereby indicating that the policy applies to all resources within the scope. A scope may be linked with more than one policy, and a policy may be linked with more than one scope. In this way, an administrator (or other party) may be given arbitrary control over the nature of policies, and the scope(s) to which those policies apply.

In one example, authorization control over resources is deployed in a distributed environment. Policies and scopes may be defined centrally, and may be propagated to other machines in an environment. Thus, each resource that falls within a particular scope may be labeled with a reference to the applicable policy. Local copies of the policies may be stored on individual machines, and each machine may also have its own local policies. When an entity requests use of a resource, the resource is examined to determine what policies apply to the resource. Those policies are then retrieved. A resource guard may determine whether the conditions specified in all of the policies exist. If the conditions do exist, then the requested use of the resource may be granted. Otherwise, the requested use may be denied. In one example, the issue of what policies apply to a resource may be evaluated at the time that a request is made with respect to that resource. That is, when an entity requests to perform an action with respect to a resource, this request may trigger an evaluation of what scope(s) the resource falls into and what policy(ies) apply to that scope.

A policy may specify what may be done with a resource, and under what circumstances the specified action may be done. For example, a policy may specify that "anyone can read the file," or "any member of the administrator's group may delete the file," or "any member of the finance group may read the file between 9:00 a.m. and 5:00 p.m.," or any other appropriate set of conditions. In these policies, what constitutes "the file" depends on what scopes have been attached to the policy. For example, a scope might be "any file in the \users\finance" folder, or "any file labeled 'high-impact'". If, for example, the scope "any file in the \user\finance" folder is linked with the policy "any member of the finance group may read the file between 9:00 a.m. and 5:00 p.m.," then the result is that any file in the "\users\finance" folder can be read by any member of the finance group during the specified hours. Additionally, policies may be based on specific types of device claims and/or user claims—e.g., "the device that is requesting the file is located in Germany", or "the device that is requesting the file has BitLocker installed" (examples of device claims); or "the user is an administrator" or "the user has updated his password within the last two weeks" (examples of user claims). (Of course, there might be other policies applicable to some or all of the files in the \users\finance folder, and the resource guard may apply these policies conjunctively, so that a requested access would be allowed if it complies with all of the policies. However, policies could also be applied disjunctively.)

Turning now to the drawings, FIG. 1 shows an example scenario in which policies and scopes may be created and applied. Authorization policy specification interface 102 is a component that allows an administrator 104 to specify authorization policies 106 and resource scopes 108. Interface 102 may take the form of software—e.g., a "dashboard" that allows an administrator to define specific policies and scopes. As noted above, authorization policies define what can be done with a resource, and under what circumstances. As also noted above, resource scopes define sets of resources to which an authorization policy can apply.

Authorization policies 106 may be defined without reference to any particular set of resources to which the policies apply. Likewise, resource scopes 108 may be defined without reference to any particular policy that applies to the resources that fall within the scope. Thus, interface 102 may also allow administrator 104 to specify associations 110 between policies and scopes. For example, an authorization policy might say "read-only access for members of the 'finance' group." A scope might be defined as "all files labeled 'high-impact.'" Linking the policy and the scope together grants, to members of the finance group, read-only access to all of the files that are labeled "high-impact." Associations 110 include such links between policies and scopes. It is noted that FIG. 1 shows a single administrator defining the policies, scopes, and associations, but there could be several administrators. In one example, there could be an administrator for the policies, an administrator for the scopes, and an administrator for the associations.

Once policies, scopes, and associations have been created in the manner described above, they may be applied to resources and enforced by a resource guard. The policies may be applied and enforced in any appropriate usage scenario, from a single stand-alone machine to a large-scale distributed computing environment. For the purpose of FIG. 1, it is merely assumed that access to a resource is being sought from some client 112, without regard to the particular environment of which client 112 is a part.

Client 112 may be a machine that stores, contains, or otherwise makes use of, a set of resources 114. (For example, client 112 may make use of a set of resources that are stored elsewhere, such as on a server.) Resources 114, as noted above, may be any types of resources such as files, devices, or anything else whose use could be controlled in some manner. Principal 116 is a user, or other entity, that makes a request 118 to perform some type of action with respect to one of resources 114 on client 112. (The requested action could be read, write, append, delete, etc.) Resource guard 120 is a component that enforces a policy, by determining whether the requested action may proceed. Resource guard 120 has access to authorization policies 106, resource scopes 108, and associations 110. Resource guard 120 may use these items from a remote, central source, or local copies 122 of these items may be stored on client 112. In making an access decision, resource guard may also consider environmental factors 121, such as the time of day, the location of a server on which the resource is stored, the location of the client from which the resource is requested, etc. Moreover, resource guard 120 may, or may not, include the component that evaluates whether the conditions to permit access are satisfied under the policy. That is, the issue of determining whether the policy permits access, which may be performed by a policy engine, is conceptually separate from the issue of the resource guard granting or denying access based on the policy engine's determination. The resource guard and the policy engine may be separate components.

There are various ways to determine which policies apply to a resource. In one example, at the time that a request is made to perform an action with respect to a resource, it may be determined (e.g., by the guard and/or policy engine) what scope(s) the resource falls into and what policy(ies) apply to those scopes. For example, if a request is made to read a resource, the set of scopes and policies could be canvassed, and it could be determined that the resource falls within a scope that permits, say, read access to any member of the "finance" group. (Any other applicable policies could be discovered in this way.) Then, it could be determined whether the requestor is a member of the finance group and whether the requested access is a read access. If so, then the conditions specified in the policy are satisfied. Any other applicable policies could be applied conjunctively—that is, access might be allowed only if all applicable policies are satisfied. In another example, policies could be applied disjunctively—that is, access could be allowed if any of the policies is satisfied. Or, there could be some other rule for combining multiple policies. If the combination of policies is satisfied (again, regardless of whether the rule to combine policies uses conjunction, disjunction, or some other rule), then guard 120 may allow access to the resource. Otherwise, guard 120 may deny the requested use of the resource. It is noted that policies may be global (applicable to resources regardless of where they are being requested), or may be local (specific to requests from a particular machine). Additionally, while the determination as to what policies apply to a resource is made, in the foregoing example, at the time the resource is being evaluated, applicability of policies could be determined at a different time—e.g., a process could evaluate scopes and policies, and could label the resources with the applicable policies, while periodically updating to allow for changes in the existing set of scopes and/or policies.

Figure 2:
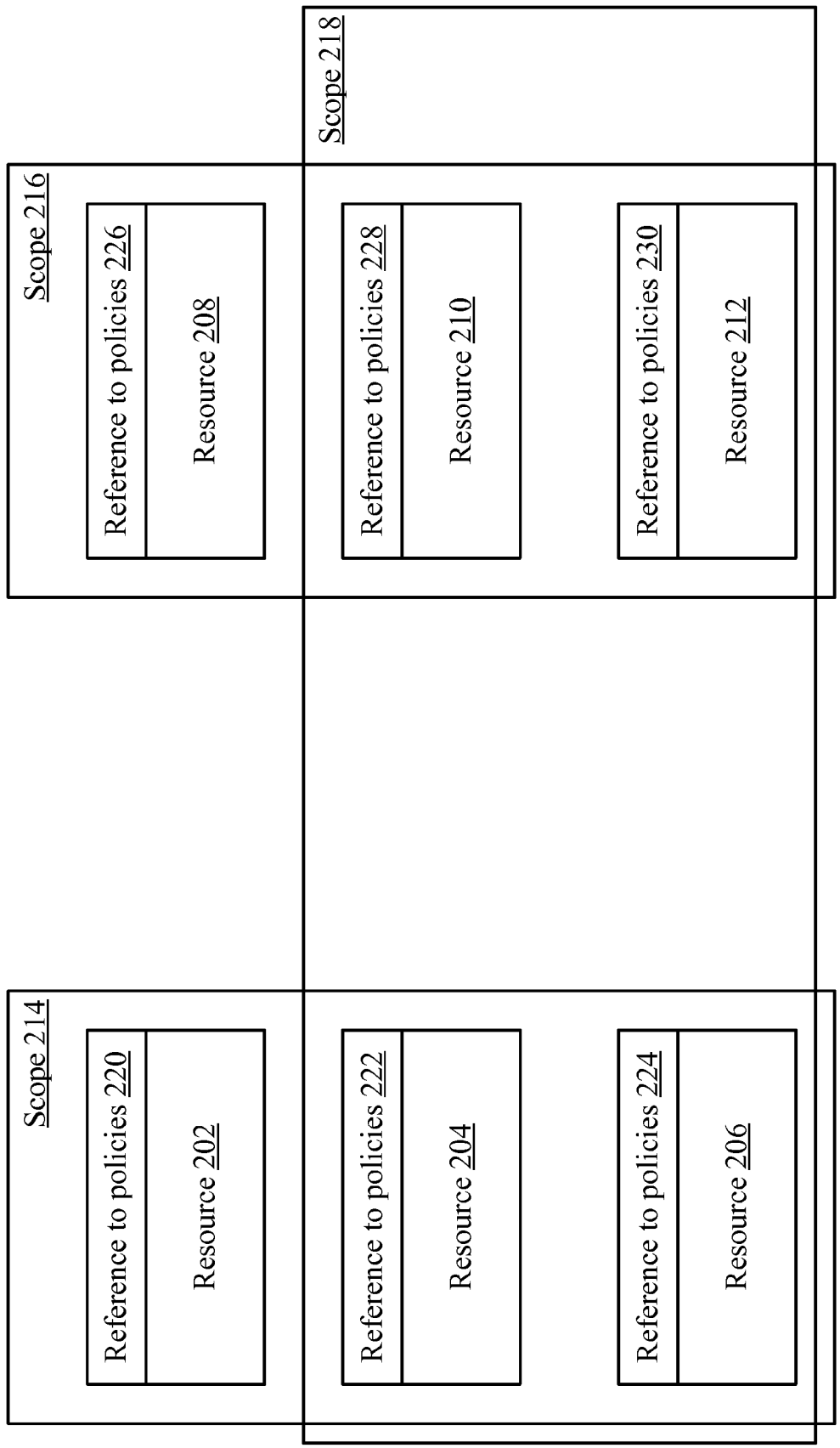
FIG. 2 is a block diagram of examples of resources, and their relation to scopes.

FIG. 2 shows examples of resources, and their relation to scopes. In FIG. 2, six resources 202, 204, 206, 208, 210, and 212 are shown. Additionally, three scopes 214, 216, and 218 are shown. Scopes 214-218 may be been defined using the authorization policy specification interface 102 that is shown in FIG. 1.

Resources 202, 204, and 206 fall within scope 214. Resources 208, 210, and 212 fall within scope 216. Resources 204, 206, 210, and 212 fall within scope 218. Thus, there is some overlap among the scopes, in the sense that resources 204 and 206 fall within both of scopes 214 and 216, and resources 210 and 212 both fall within scopes 216 and 218.

If particular policies have been linked with a scope, then the resources that fall within the scope may be subject to those policies at the time that access to those resources is requested. Thus, resources 202, 204, 206, 208, 210, and 212 have references 220, 222, 224, 226, 228, and 220, respectively, to the various policies that apply to those resources. Since resources 204 and 206 both fall within scopes 214 and 218, resources 204 and 206 would have the same set of policy references. Likewise for resource 210 and 212, which both fall within scopes 216 and 218. In one example, whether a resource falls within a set of scopes, and what policies apply to those scopes may be determined at the time that a request for a resource is made. However, in another example, there may be a process that evaluates resources on a recurring basis, or whenever there is a change to scopes and/or policies, to determine whether there are any changes as to which policies apply to a given resource. That process may add and/or change a given resource's policy references, according to the changes that take place to policies, scopes, and the associations between policies and scopes.

Figure 3:
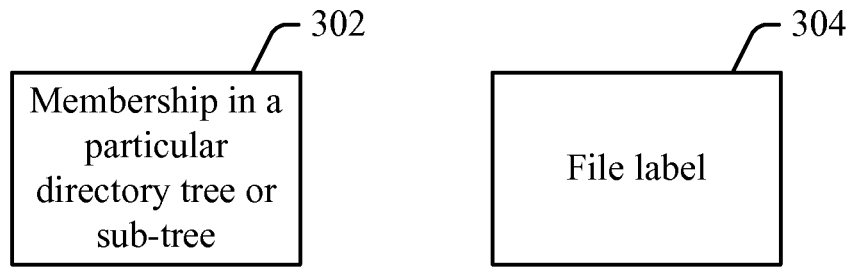
FIG. 3 is a block diagram of some general classes of resources that may be defined in a scope.

The scopes may have been defined as descriptions of general classes of resources. FIG. 3 shows some examples of these general classes of resources, although it will be understood that the subject matter described herein is not limited to these examples.

In one example, a resource scope may be defined based on membership in a particular folder, or a directory sub-tree rooted at a particular folder (block 302). For example, a scope might include all files that are in folder c:\documents\finance, or all files that are in the directory sub-tree rooted at that folder. In another example, a scope might include all resources that have a particular label (block 304). For example, files might be labeled for high, medium, or low "impact" (e.g., depending on the level of sensitivity of the information they contain). Thus, a scope might include all files labeled "high-impact." Based on the definition of a scope (e.g., the types of scope described in blocks 302 and 304, or any other type of scope) it can be determined what resources fall within that scope.

Figure 4:
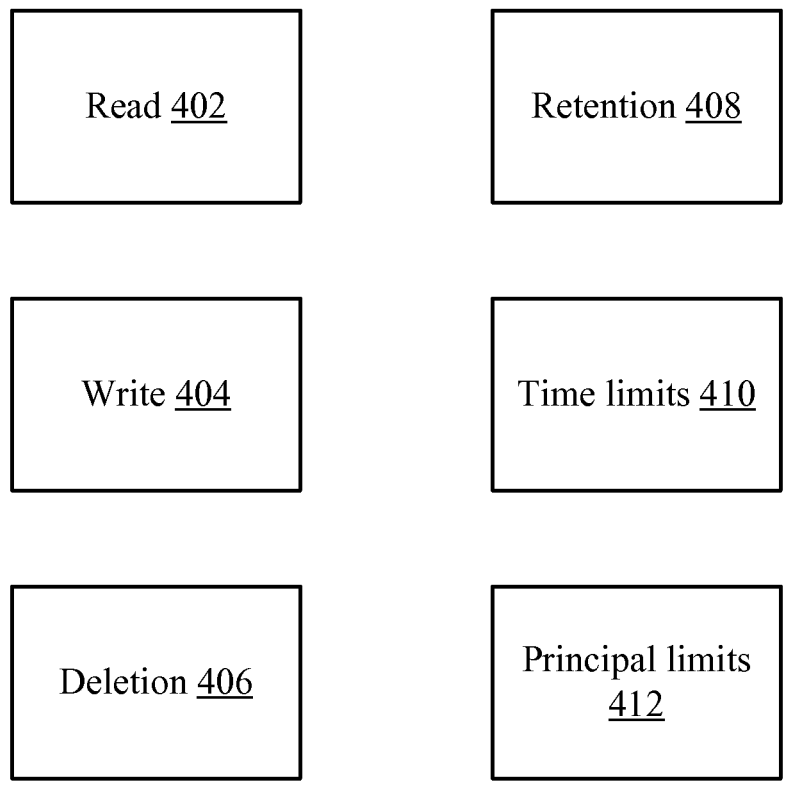
FIG. 4 is a block diagram of some example terms of policies.

FIG. 4 shows example of terms of policies (which, as noted above, may be defined separately from the scopes). Examples of policy terms include read 402, write 404, deletion 406, retention 408, time limits 410, and principal limits 412. Read 402 refers to the ability to read a resource. Write 404 refers to the ability to write or modify a resource. Deletion 406 refers to the ability to delete or remove a resource (e.g., deleting a file). Retention 408 refers to an obligation to retain a resource (e.g., a company-wide document retention policy that might be imposed to preserve evidence for a legal inquiry). Time limits 410 and principal limits 412 refer to the idea that a policy might make the performance of a particular act on a resource conditional on facts that are external to the resource, such as the time period during which the request is being made and/or who is making the request. Thus, a policy might say, "read access for everyone" (i.e., read access, without any conditions). But, in another example, the policy might say, "read access between 9:00 a.m. and 5:00 p.m." (an example of a time limit), or "read access for the principal named 'Joe'" (an example of a principal limit), or "read access for members of the 'finance' group" (also an example of a principal limit, where the principal is identified indirectly through group membership), or "read access for members of the 'finance' group between 9:00 a.m. and 5:00 p.m." (an example of a combined limit on both time and principal). Other examples of policies might specify "the files can only be written to servers that have bitlocker turned on" or "the requestor client is to be located in the same country as the target resource server."

Figure 5:
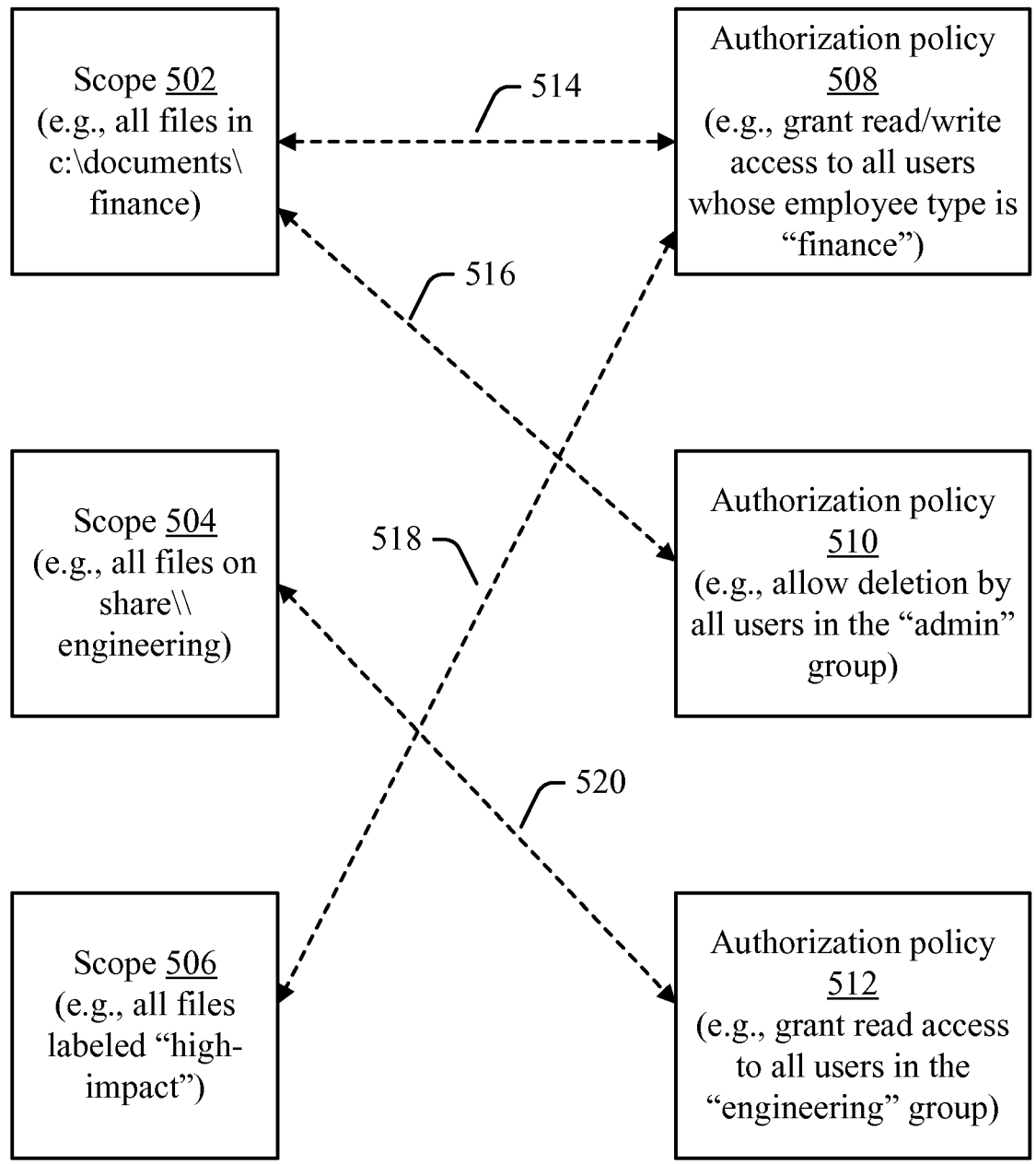
FIG. 5 is a block diagram of an example in which policies and scopes may be linked together.

FIG. 5 shows an example in which policies and scopes may be linked together. As noted above, the linking or association of a policy with a scope indicates that the policy applies to those resources that fall within the scope.

In the example of FIG. 5, three scopes 502, 504, and 506 are shown. Scope 502 encompasses all files in the directory c:\documents\finance. Scope 504 encompasses all files on the shared file system share\\engineering. Scope 506 encompasses all files labeled "high-impact."

The example of FIG. 5 also shows three authorization policies 508, 510, and 512. Authorization policy 508 specifies read/write access for all users whose employee type is "finance". (This is another example of a principal limit, since the policy in question restricts access based on who is asking to perform the requested action.) Authorization policy 510 specifies that members of the "admin" group are allowed to delete a resource. Authorization policy 512 specifies read access for all users in the "engineering" group.

FIG. 5 also shows four associations between scopes and policies. In particular, association 514 links policy 508 with scope 502, thereby allowing users with the "finance" employee type to read and write files that are in the c:\documents\finance directory. Association 516 links policy 510 with scope 502, thereby allowing members of the "admim" group to delete files that are in the c:\documents\finance directory. Association 518 links policy 508 with scope 506, thereby allowing users with the "finance" employee type to read and write documents that have the "high-impact" label. Association 520 links policy 512 with scope 504, thereby allowing all users in the "engineering" group to read files on the "engineering" share.

Figure 6:
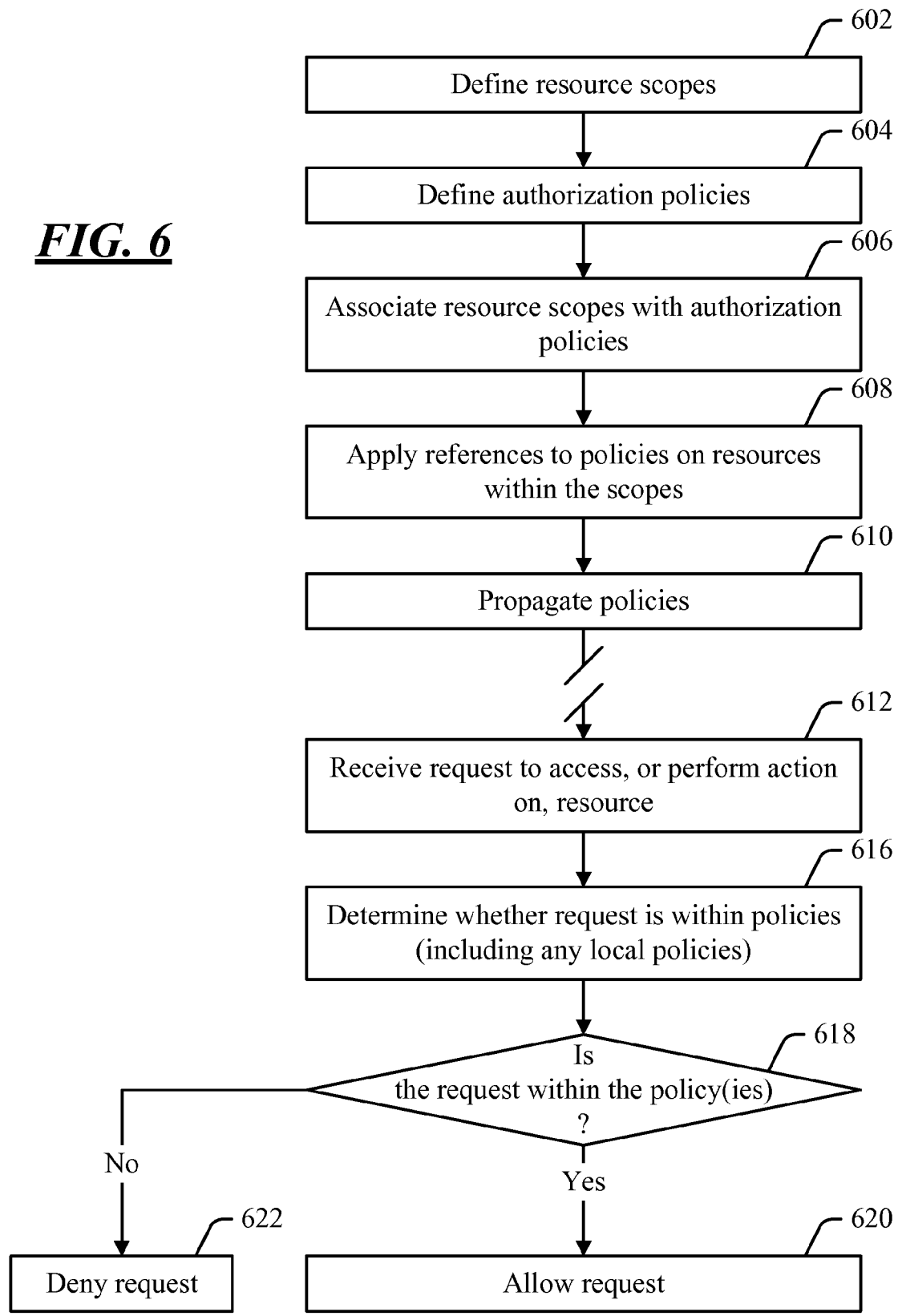
FIG. 6 is a flow diagram of an example process in which policies and scopes may be defined, applied, and/or enforced.

FIG. 6 shows an example process in which policies and scopes may be defined, applied, and/or enforced. Before turning to a description of FIG. 6, it is noted that the flow diagram contained in FIG. 6 is described, by way of example, with reference to components shown in FIGS. 1-5, although the process of FIG. 6 can be carried out in any system and is not limited to the scenarios shown in FIGS. 1-5. Additionally, the flow diagram in FIG. 6 shows an example in which stages of a process are carried out in a particular order, as indicated by the lines connecting the blocks, but the various stages shown in this diagram can be performed in any order, or in any combination or sub-combination.

At 602, resource scopes may be defined. As noted above, a resource scope may be a description of a set of resources, such that it can be determined whether a resource falls within the scope. At 604, a set of authorization policies may be defined. As noted above, an authorization policy specifies what action may be performed with respect to a resource, and under what conditions. As also described above, policies and scopes may be defined separately from each other—i.e., a policy may be defined without reference to a particular set of references to which it will apply, and a scope may be defined without reference to a particular set of policies that will apply to resources within the scope.

At 606, policies may be associated with scopes. The linking of a policy with a scope indicates that the policy applies to those resources that fall within a scope. A given policy may be linked with zero or more scopes. A given scope may be linked with zero or more policies. Thus, a given scope may have any number of policies (including zero) that apply to resources in that scope. And a given policy may have any number of scopes (including zero) to which the policy applies.

At 608, references to policies are applied to resources. That is, if a particularly resource falls within a scope that is associated with a policy, then a reference to that policy is applied to the resource. FIG. 2, discussed above, shows examples in which resources are labeled with references to policies. Such references may be applied to resources at 608.

At 610, the various policies may be propagated. In one example, the resources to which access is controlled are made available in a distributed computing environment. In order to allow requests to use resources to be evaluated efficiently, the policies themselves may be propagated to the various client machines in the distributed environment, thereby allowing a guard to evaluate a request without having to obtain the policy from a central location at the time of the request.

Some amount of time may pass (as indicated by the two parallel diagonal lines between 610 and 612). Then, at 612, a request may be received to access, or to perform an action on, a resource. The request may be received, for example, at the machine at which the action is to be performed. Thus, a user of a particular computer may be the principal who is requesting access to the resource, and he or she may make this request through that computer. Thus, in this example, the request to use the resource is received at that computer. It is noted that the actual resource that is requested may, or may not, be present at the computer. For example, the resource might be a file present on the computer's local hard disk, but could instead be a file located in a share that is maintained on a remote server.

At 616, it is determined whether the requested use of the resource (or the requested action to be performed on the resource) is within the applicable policies. Applicable policies may include any policies linked to scopes within which the reference falls. The applicable policies may also include local policies that are specific to the machine on which access is requested (or that are specific to some group of machines that includes the machine on which access is requested). In one example, the various policies are applied conjunctively—i.e., the policies may be treated as being collectively satisfied only if the conditions in all of the policies are satisfied. For example, if a file is subject to two policies—the first of which says the file is to be retained for the next two years, the second of which says that the file may be deleted by members of the "admin" group—then conjunctive application of these policies would deny a request to delete the file. Even if a member of the "admin" group requests the deletion, the second policy permits the requested action, but the first policy does not. So, under conjunctive application of policies, the request would be denied. (However, it is noted that the subject matter of this application is not limited to conjunctive application of policies. In another example, policies could be applied disjunctively. For example, a security system could be configured to allow for an administrative override to the policies that would otherwise apply. Thus, if an administrator chose to allow access in a situation in which the conjunction of other policies otherwise would disallow access, then access could be allowed.)

If the requested action is within the applicable policy(ies) (at 618), then the request is granted (at 620). Otherwise, the requested action is denied (at 622).

Although the subject matter herein may be deployed in any appropriate system, the following is one example of how the subject matter herein can be implemented on WINDOWS operating systems:

In the ACTIVE DIRECTORY service, a user interface may be provided for an administrator to define authorization policies. Authorization policies may then be stored in the ACTIVE DIRECTORY service, and each policy includes a name, a distinct identifier, and a security policy in the form of a binary security descriptor. The authorization policies may be queried in the ACTIVE DIRECTORY service based on their name or distinct identifier. The group policy is extended to allow for the association of specific authorization policies with specific Group Policy Objects (GPOs.) GPOs can be applied to sets of one or more computers. To transfer the authorization policies associated with a GPO to the computers to which the GPO applies, the Group Policy framework is extended to transfer the associated authorization policy to each computer as a Group Policy setting to be stored in the computers registry.

A resource scope can be defined on WINDOWS file servers in terms of the folders or shares that include files to which the administrator wishes to apply a common authorization policy. This may include a single folder, set of folders, a network share, or a network share distributed across multiple WINDOWS file servers. The resource scope can be defined at the root folder or share that contains all the files and folders to which a common policy is to be applied.

To allow an administrator to associate an authorization policy with a resource scope a user interface is provide for an administrator to edit the attributes on the root folder of a resource scope to select one or more authorization policies from a list of all authorization policies enumerated in the ACTIVE DIRECTORY service. At this time each file in the scope is marked with an identifier of the authorization policy.

To enforce the authorization policies described herein, the AccessCheck Application Programming Interface (API) is extend to analyze a file's security descriptor for an identifier of one or more authorization policies. When a security principal makes a request to access a file on a WINDOWS file server, if one or more authorization policies are specified in the file's security descriptor, AccessCheck will apply each identified authorization policy. In order for the security principal to be granted the requested access, the security principal may be given access according all authorization policies identified in the file's security descriptor.

Figure 7:
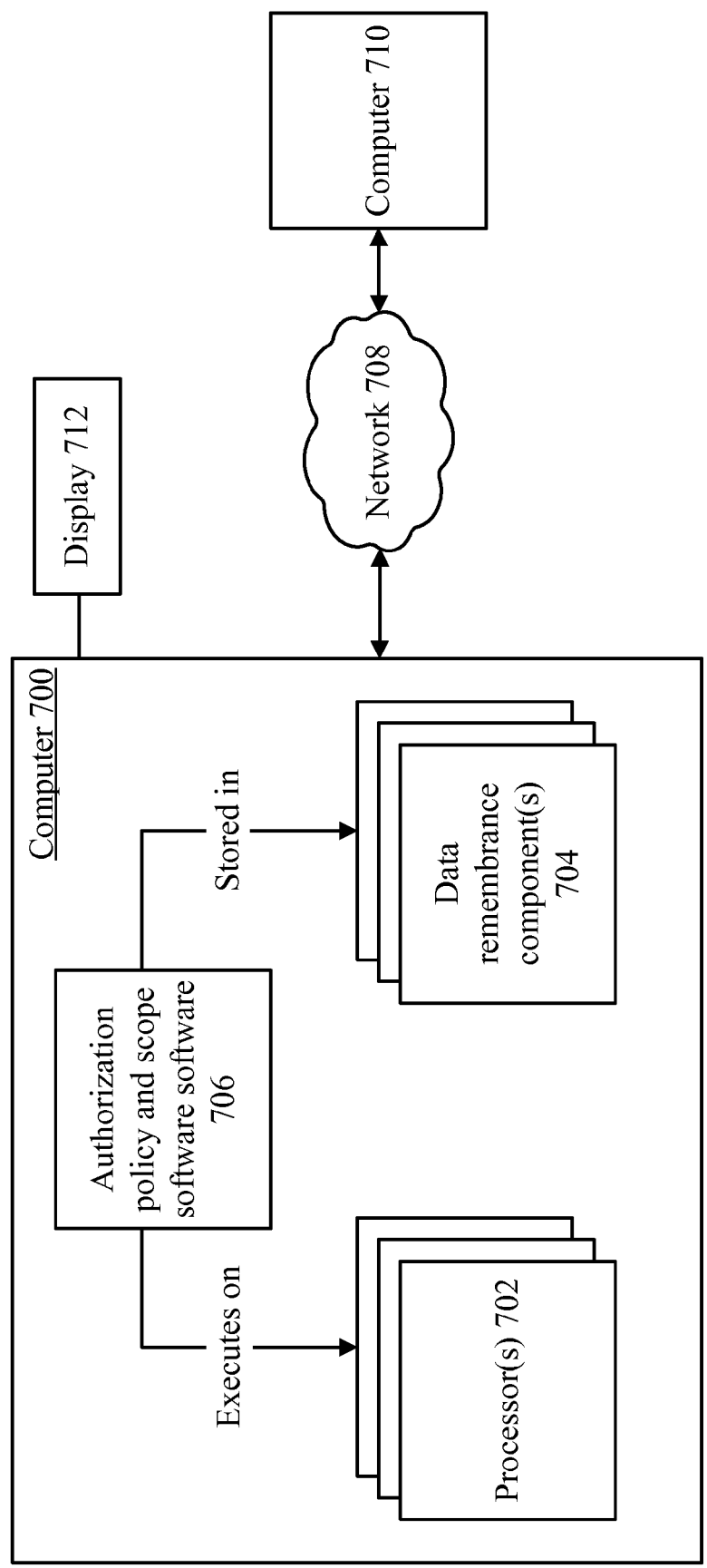
FIG. 7 is a block diagram of example components that may be used in connection with implementations of the subject matter described herein.

FIG. 7 shows an example environment in which aspects of the subject matter described herein may be deployed.

Computer 700 includes one or more processors 702 and one or more data remembrance components 704. Processor(s) 702 are typically microprocessors, such as those found in a personal desktop or laptop computer, a server, a handheld computer, or another kind of computing device. Data remembrance component(s) 704 are components that are capable of storing data for either the short or long term. Examples of data remembrance component(s) 704 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 700 may comprise, or be associated with, display 712, which may be a cathode ray tube (CRT) monitor, a liquid crystal display (LCD) monitor, or any other type of monitor.

Software may be stored in the data remembrance component(s) 704, and may execute on the one or more processor(s) 702. An example of such software is authorization policy and scope software 706, which may implement some or all of the functionality described above in connection with FIGS. 1-6, although any type of software could be used. Software 706 may be implemented, for example, through one or more components, which may be components in a distributed system, separate files, separate functions, separate objects, separate lines of code, etc. A computer (e.g., personal computer, server computer, handheld computer, etc.) in which a program is stored on hard disk, loaded into RAM, and executed on the computer's processor(s) typifies the scenario depicted in FIG. 7, although the subject matter described herein is not limited to this example.

The subject matter described herein can be implemented as software that is stored in one or more of the data remembrance component(s) 704 and that executes on one or more of the processor(s) 702. As another example, the subject matter can be implemented as instructions that are stored on one or more computer-readable storage media. Tangible media, such as an optical disks or magnetic disks, are examples of storage media. The instructions may exist on non-transitory media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium. It is noted that there is a distinction between media on which signals are "stored" (which may be referred to as "storage media"), and—in contradistinction—media that contain or transmit propagating signals. DVDs, flash memory, magnetic disks, etc., are examples of storage media. On the other hand, wires or fibers on which signals exist ephemerally are examples of transitory signal media.

Additionally, any acts described herein (whether or not shown in a diagram) may be performed by a processor (e.g., one or more of processors 702) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 700 may be communicatively connected to one or more other devices through network 708. Computer 710, which may be similar in structure to computer 700, is an example of a device that can be connected to computer 700, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. One or more computer-readable storage media that store executable instructions to perform a method of enforcing authorization policies, wherein the instructions, when executed by a computer, cause the computer to:

receive definitions of said authorization policies, wherein said authorization policies do not specify which resources said authorization policies apply to;

receive definitions of a plurality of resource scopes, wherein said resource scopes do not specify which authorization policies apply to resources within said resource scopes;

receive a plurality of associations between specific ones of said authorization policies and specific ones of said resource scopes, wherein an association between a first one of said authorization policies and a first one of said resource scopes indicates that said first one of said authorization policies applies to those resources that fall within said first one of said resource scopes;

mark each resource within said first one of said resource scopes with identifiers of all of said authorization policies, there being a plurality of said authorization policies;

receive a request to perform an action with respect to a resource;

determine, at a time subsequent to said receiving of said plurality of associations between said authorization policies and said resource scopes, whether said resource falls within said resource scopes;

determine whether said action, and circumstances under which said action is requested, comply with those policies that are associated with scopes into which said resource falls by applying each policy with which said resource is marked; and in response to determining that said resource falls within said resource scope and that said action, and said circumstances under which said action is requested, comply with those policies that are associated with said scopes into which said resource falls, allow said request.

2. The one or more computer-readable storage media of claim 1, wherein said request is received at a local machine, and wherein said said instructions further cause the computer to:
  determine whether said action, and said circumstances under which said action is requested, comply with one or more policies that are specific to said local machine.

3. The one or more computer-readable storage media of claim 1, wherein said determining that said resource falls within said resource scope and that said action, and said circumstances under which said action is requested, comply with those policies that are associated with said scopes into which said resource falls, applies a plurality of policies conjunctively to said request.

4. The one or more computer-readable storage media of claim 1, said instructions further causing the computer to:
  associate a plurality of said resource scopes with one of said authorization policies.

5. The one or more computer-readable storage media of claim 1, said instructions further causing the computer to:
  associate a plurality of said authorization policies with one of said resource scopes.

6. The one or more computer-readable storage media of claim 1, wherein said first one of said authorization policies specifies a user claim as a condition, and wherein said determining that said resource falls within said resource scope and that said action, and said circumstances under which said action is requested, comply with those policies that are associated with said scopes into which said resource falls, comprises determining that said user claim is satisfied.

7. The one or more computer-readable storage media of claim 1, wherein said first one of said authorization policies specifies a device claim as a condition, and wherein said determining that said resource falls within said resource scope and that said action, and said circumstances under which said action is requested, comply with those policies that are associated with said scopes into which said resource falls, comprises determining that device claim is satisfied.

8. The one or more computer-readable storage media of claim 1, wherein said first one of said authorization policies allows deletion, or specifies retention, of resources.

9. The one or more computer-readable storage media of claim 1, wherein said first one of said authorization policies specifies a factor external to said resource, and wherein said determining that said resource falls within said resource scope and that said action, and said circumstances under which said action is requested, comply with those policies that are associated with said scopes into which said resource falls, comprises determining that conditions in said external factor are satisfied.

10. The one or more computer-readable storage media of claim 1, wherein said first one of said authorization policies specifies a limit on which principals may request to perform actions with respect to resources, and wherein said determining that said resource falls within said resource scope and that said action, and said circumstances under which said action is requested, comply with those policies that are associated with said scopes into which said resource falls, comprises determining that said request is made by one of said principals.

11. The one or more computer-readable storage media of claim 1, wherein said resource comprise files maintained by an ACTIVE DIRECTORY service, and wherein said authorization policies, resource scopes, and associations between authorization policies and resource scopes are maintained by said ACTIVE DIRECTORY service.

12. The one or more computer-readable storage media of claim 1, wherein said authorization policies, resource scopes, and associations between authorization policies and resource scopes are maintained by a central service, and wherein said instructions further cause the computer to:
  propagate said authorization policies to local machines on which requests for said resources are received.

13. The one or more computer-readable storage media of claim 1, wherein a first resource comprises references to those authorization policies that are associated with resource scopes into which said resource falls, and wherein said instructions further cause the computer to:
  determine which authorization policies to associate with resources, based on which resource scopes contain resources and also based on which authorization policies are associated with which resource scopes.

14. A method of defining and enforcing policies, the method comprising:
  using a processor to perform acts comprising:
    using an interface to define a plurality of authorization policies that do not specify which resources said authorization policies apply to;
    using said interface to define a plurality of resource scopes that do not specify which authorization policies apply to resources within said resource scopes;
    using said interface to specify associations between said authorization policies and said resource scopes, such that an association between a first one of said authorization policies and a first one of said resource scopes indicates that said first one of said authorization policies governs how resources that fall within said first one of said resources scopes are used;
    marking each resource within said first one of said resource scopes with identifiers of all of said authorization policies;
    making a request to use a first resource;
    determining that use of said first resource is allowed by applying, to said request, each policy with which said resource is marked; and
    making use of said first resource, wherein said request is allowed by all authorization policies that are associated with resource scopes into which said resource falls, and all local policies on a machine on which said request is made, whether said first resource falls within said resource scopes being determined subsequent to specification of said associations between said authorization policies and said resource scopes.

15. The method of claim 14, wherein said acts further comprise:
  using said interface to associate a plurality of resource scopes with a given authorization policy.

16. The method of claim 14, wherein said acts further comprise:
  using said interface to associate a plurality of authorization policies with a given resource scope.

17. A system for enforcing authorization policies, the system comprising:
  a memory;
  a processor;
  an interface component that is stored in said memory and that executes on said processor, said interface component configured to receive a plurality of authorization policies, a plurality of resource scopes, and a plurality of associations between said authorization policies and said resource scopes, wherein an association between a first authorization policy and a first resource scope indicates that said first authorization policy governs use of resources that fall within said first resource scope, wherein said authorization policies do not, without said associations, identify resources to which said authorization policies apply, and wherein said resource scopes do not, without said associations, indicate authorization policies that apply to resources within said resource scopes, each resource within said first one of said resource scopes being marked with identifiers of all of said authorization policies; and a guard configured to receive a request to perform an action with respect to a first resource, to use a policy engine to make a determination, based at least on receipt of said request, said scopes, said policies, and said associations, which authorization policies apply to said first resource and whether said action, and circumstances under which said request is made, are allowed by the authorization policies that apply to said first resource, and wherein said guard is further configured to allow or deny said request based on said determination, said guard further configured to determine which of said scopes said first resource falls within subsequent to receipt of said plurality of associations by said interface component, said guard further configured to make said determining as to whether said action is allowed by applying to said request each authorization policy with which said first resource is marked.

18. The system of claim 17, further comprising a central machine on which said interface component is located, and wherein said central machine is configured to propagate said authorization policies to local machines on which requests to use said resources are made.

19. The system of claim 17, wherein said policies comprise device claims as conditions or user claims as conditions.

20. The system of claim 17, wherein said interface component is configured to receive plural associations between a given resource scope and said authorization policies, and wherein said interface component is configured to receive plural associations between a given authorization policy and said resource scopes.

* * * * *